April 4, 1961  J. G. JENNE  2,977,863
PLASTIC COMPOSITION FOR FLOOR COVERING
AND METHOD OF APPLYING SAME
Filed Jan. 10, 1956
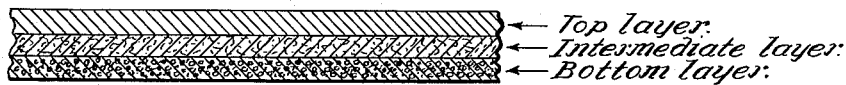
← Top layer.
← Intermediate layer.
← Bottom layer.
INVENTOR
John G. Jenne.
BY
ATTORNEY

United States Patent Office 2,977,863
Patented Apr. 4, 1961

2,977,863

PLASTIC COMPOSITION FOR FLOOR COVERING AND METHOD OF APPLYING SAME

John G. Jenne, 4 Frankish Ave., Toronto, Ontario, Canada

Filed Jan. 10, 1956, Ser. No. 558,399

1 Claim. (Cl. 94—3)

This invention relates to plastic compositions for floor covering and to methods of applying the same.

The principal object of this invention is to provide a method for forming and applying a plastic floor covering which may be easily and quickly produced and applied upon cement, wood, stone, terrazzo or any other type of flooring, to form a surface covering of excellent gloss, hardness and wear resistant qualities.

A further object of the invention is to provide a plastic composition, the proportions and ingredients of which may be varied in the application to the floor in successive layers, so as to secure maximum strength adhesion and superior surface finish.

A still further object is to provide a gradation of the types of solids included in the various layers of the plastic so that the coarsest solid particles are incorporated in the bottom and the finer solids are incorporated in the upper layers.

Another object is to provide a method whereby the various layers of plastic are applied in double coats.

In the annexed drawing the figure is a fragmental sectional elevation on an enlarged scale through my improved plastic flooring composition illustrating the various layers forming the same.

Now, proceeding to describe in detail the novel formulation of my improved plastic flooring composition and the method of applying the same upon a floor so as to form a floor covering having the desirable qualities above set forth.

For the bottom layer of plastic I preferably provide the following formulation:

2 gallons of water;
1 gallon of an acrylic resin emulsion such for example as is known in the trade as Rhoplex AC33, an emulsion of a copolymer of methyl methacrylate and ethyl acrylate;
3 gallons of fine screened sand;
¾ of a gallon of Asbestine $X_3$;
1 gallon of fiber asbestos;
¼ gallon (approximately) iron oxide colors;
0.1% of total ingredients, an anti-foam agent, for example, such as known in the trade as "Nopco," described in Patent No. 2,346,928 as any suitable partial ester of a polyhydric alcohol combined with a higher fatty acid containing at least one hydroxyl group.

The ingredients should be thoroughly mixed and spread evenly on the floor with a trowel or knife, forming a thin layer which sets sufficiently in about six hours, following which a second coat of the same mixture may be similarly applied.

After the bottom layer has set, requiring about twelve hours, an intermediate layer is applied of the following formulation:

2 gallons of an acrylic resin emulsion, for example, such as is known in the trade as Rhoplex AC33 of the chemical composition hereinabove described;
4 gallons of white silica;
⅔ gallon of Asbestine;
⅓ gallon (approximately) iron oxide colors;
1 gallon of water;
0.1% of total ingredients, an anti-foam agent, for example, such as known in the trade as "Nopco," having a chemical composition as hereinabove described.

The above ingredients are thoroughly mixed and applied evenly by trowel or knife and allowed to set for about three hours, and then a second coat of the same composition is similarly applied and allowed to set.

After the second two-coat layer has set requiring about three hours, a third layer is applied of the following formulation:

4 gallons of the acrylic resin emulsion above mentioned, for example, such as is known in the trade as Rhoplex AC33 of the chemical composition hereinabove described;
5 gallons of kaolin clay (hydrated);
½ gallon talc (fine);
½ gallon iron oxide colors;
1 gallon water;
¼ gallon of a dispersing agent, such as a 10% solution of a dispersant known in the trade as "Tamol" (sodium salt of a naphthalene sulfonic acid condensed with formaldehyde);
0.1% of total ingredients of an anti-foam agent, for example, such as is known in the trade as "Nopco," having a chemical composition as hereinabove described.

After thoroughly mixing the above ingredients, this last layer may be applied in two coats by any conventional means, such as trowel, brush, roller, or spray gun. After the first coat has set in about two hours, the second may be applied.

It will thus be seen that the improved floor covering of excellent hardness, wear resistant qualities and high gloss may be applied in six coats requiring comparatively short total elapsed time. The operation is substantially odorless and causes little inconvenience to persons requiring access to the premises while the covering is being applied.

Having thus described my invention, I claim:

In combination with a floor, a covering thereon comprising a three layered plastic composition including a bottom layer of substantially the following formulation:

1 gallon of an emulsion of a copolymer of methyl methacrylate and ethyl acrylate,
3 gallons of fine screened sand,
¾ gallon of Asbestine,
1 gallon of asbestos fiber,
¼ gallon of iron oxide color,
2 gallons of water, and
0.1% total ingredients, of an anti-foam agent;

an intermediate layer of substantially the following formulation:

2 gallons of said copolymer emulsion,
4 gallons of fine white silica,
⅔ gallon of Asbestine,
⅓ gallon of iron oxide color,
1 gallon of water,
0.1% of total ingredients of an anti-foam agent;

and a top layer of substantially the following formulation:

4 gallons of said copolymer emulsion,
5 gallons of kaolin clay,
½ gallon of fine talc,
½ gallons of iron oxide color,
1 gallon of water, ¼ gallon of a 10% solution of a dispersing agent, 0.1% of total ingredients of an anti-foam agent.

References Cited in the file of this patent

UNITED STATES PATENTS

| | | |
|---|---|---|
| 1,717,769 | Gordon | June 18, 1929 |
| 2,311,233 | Jaenicke | Feb. 16, 1943 |
| 2,422,665 | Fredrickson | June 24, 1947 |
| 2,467,341 | Seymour | Apr. 12, 1949 |
| 2,490,247 | Amberg | Dec. 6, 1949 |
| 2,558,378 | Petry | June 26, 1951 |
| 2,572,252 | Erasmus | Oct. 23, 1951 |
| 2,624,683 | Bezman | Jan. 6, 1953 |
| 2,682,517 | Asaff | June 29, 1954 |
| 2,731,435 | Johnson et al. | Jan. 17, 1956 |
| 2,790,735 | McLaughlin | Apr. 30, 1957 |

FOREIGN PATENTS

| | | |
|---|---|---|
| 523,349 | Great Britain | 1940 |

OTHER REFERENCES

Rohm & Haas Reporter, September-October 1953, volume XI, No. 5, Philadelphia 5, Pa.